United States Patent
Nam et al.

(10) Patent No.: US 11,604,205 B2
(45) Date of Patent: Mar. 14, 2023

(54) METHODS AND APPARATUS FOR RISK DETERMINATION

(71) Applicants: Seoul National University R&DB Foundation, Seoul (KR); National Institute Of Environmental Research, Incheon (KR)

(72) Inventors: Kyoung Phile Nam, Seoul (KR); Seung Muk Yi, Seoul (KR); Sang Hyun Kim, Seoul (KR); Hyeon Yong Chung, Seoul (KR); Young Kwon Kim, Seoul (KR); Hyun Koo Kim, Goyang-si (KR); Hoe Jung Noh, Incheon (KR); Ji In Kim, Seoul (KR); Hyen Mi Chung, Seoul (KR)

(73) Assignees: Seoul National University R&DB Foundation, Seoul (KR); National Institute Of Environmental Research, Incheon (KR)

( * ) Notice: Subject to any disclaimer, the term of this patent is extended or adjusted under 35 U.S.C. 154(b) by 376 days.

(21) Appl. No.: 17/060,146

(22) Filed: Oct. 1, 2020

(65) Prior Publication Data
US 2021/0270865 A1    Sep. 2, 2021

(30) Foreign Application Priority Data
Feb. 28, 2020    (KR) .......................... 10-2020-0025317

(51) Int. Cl.
*G01P 5/02*    (2006.01)

(52) U.S. Cl.
CPC ..................................... *G01P 5/02* (2013.01)

(58) Field of Classification Search
CPC ........................................................ G01P 5/02
USPC ............................................................. 702/2
See application file for complete search history.

(56) References Cited

U.S. PATENT DOCUMENTS

| | | | |
|---|---|---|---|
| 2008/0281528 A1* | 11/2008 | Relle, Jr. | G01N 1/2273 702/50 |
| 2020/0300882 A1* | 9/2020 | Matheis | G01N 29/00 |

FOREIGN PATENT DOCUMENTS

| | | |
|---|---|---|
| JP | 4935816 B2 | 5/2012 |
| KR | 20060071536 A | 6/2006 |
| KR | 1020080040352 A | 5/2008 |
| KR | 1020160035577 A | 3/2016 |
| KR | 102018281 B1 | 9/2019 |

OTHER PUBLICATIONS

Environmental Chemodynamics, Louis J. Thibodeaux. pp. 369-392.
Rapid Assessment of Exposure to Particulate Emissions from Surface Contamination Sites, EPA/600/8-85/002, Feb. 1985, 160 pages.
(Continued)

*Primary Examiner* — Aditya S Bhat
(74) *Attorney, Agent, or Firm* — George McGuire (57) ABSTRACT

A risk determining method and apparatus are disclosed. The risk determining method includes obtaining a plurality of sets of elevation-velocity data, determining a diffusion prediction coefficient based on the obtained sets of elevation-velocity data, determining at least one of a volatilization factor (VF) or a particulate emission factor (PEF) based on the determined diffusion prediction coefficient, and determining a risk from an inhalation exposure based on the at least one of the VF or the PEF.

17 Claims, 5 Drawing Sheets

(56) References Cited

OTHER PUBLICATIONS

US EPA (United States Environmental Protection Agency), May 2020, 9 pages.
Analysis on the Risk-Based Screening Levels Determined by Various Risk Assessment Tools (II): Derivation of Particulate Emission Factor at Former Janghang Smelter Site. Jae-Woong Jung et al. vol. 17(s), p. 21-31, 2012.
Analysis on the Risk-Based Screening Levels Determined by Various Risk Assessment Tools (III): Proposed Methodology for Lead Risk Assessment in Korea Jae-Woong Jung et al. J. Soil Groundw. nviron. vol. 20(6), p. 1-7, 2015.
Korean Office Action.

\* cited by examiner

```
            ┌─────────────┐
            │    Start    │
            └──────┬──────┘
                   │
                   ▼                              ┌─110
    ┌──────────────────────────────────────┐
    │   Obtain sets of elevation-velocity data  │
    └──────────────┬───────────────────────┘
                   │
                   ▼                              ┌─120
    ┌──────────────────────────────────────┐
    │ Determine predicted diffusion coefficient based on │
    │     obtained sets of elevation-velocity data       │
    └──────────────┬───────────────────────┘
                   │
                   ▼                              ┌─130
    ┌──────────────────────────────────────┐
    │  Determine at least one of VF or PEF based on      │
    │        predicted diffusion coefficient             │
    └──────────────┬───────────────────────┘
                   │
                   ▼                              ┌─140
    ┌──────────────────────────────────────┐
    │ Determine risk from inhalation exposure based on   │
    │           at least one of VF or PEF                │
    └──────────────┬───────────────────────┘
                   │
                   ▼
            ┌─────────────┐
            │     End     │
            └─────────────┘
```

METHODS AND APPARATUS FOR RISK DETERMINATION

This invention was made with government support under NIER-2019-04-02-084, NIER-2018-03-02-004 awarded by National Institute of Environmental Research. The government has certain rights in the invention.

CROSS-REFERENCE TO RELATED APPLICATIONS

This application claims the benefit under 35 USC § 119(a) of Korean Patent Application No. 10-2020-0025317 filed on Feb. 28, 2020, in the Korean Intellectual Property Office, the entire disclosure of which is incorporated herein by reference for all purposes.

BACKGROUND

1. Field

The following description relates to a risk determining method and apparatus, and more particularly, a site-specific inhalation exposure assessment technology using a wind velocity measurer that measures a wind velocity at each elevation.

2. Description of Related Art

A risk assessment is a series of processes including determining information of harmfulness of hazardous substances or materials, conducting a toxicity assessment and harmfulness determination, and conducting an exposure assessment and risk determination. For the risk assessment, various exposure paths through which a contaminant may be exposed to a receptor needs to be considered. The exposure paths include, for example, a path along which a volatile contaminant in outdoor air is inhaled and a path along which scattered or diffused contaminated soil is inhaled.

A current guideline for risk assessment of soil contaminants presents only a basic exposure calculating formula for exposure paths in relation to the inhalation of outdoor volatile substances and the inhalation of fugitive dust, and default values of factors associated with the formula. In addition, the default values of the factors are from those presented in foreign documents, and it is thus impossible to conduct a site-specific inhalation exposure assessment in such a current situation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect provides a method and apparatus that uses a volatilization factor (VF) and a particulate emission factor (PEF) to predict the volatilization of soil contaminants or the scattering or diffusion of contaminated soil, and determines a diffusion prediction coefficient (Q/C) to conduct a site-specific inhalation exposure assessment.

The method and apparatus may determine a risk from an inhalation exposure based on at least one of the VF or the PEF.

The method and apparatus may predict a probability that contaminated soil in a site scatters or diffuses using an in-site friction (wind) velocity that is derived in a process of calculating a site-specific diffusion prediction coefficient, and thus apply the predicted probability to monitor and control a contaminated site.

According to an example embodiment, there is provided a risk determining method including obtaining a plurality of sets of elevation-velocity data, determining a diffusion prediction coefficient based on the obtained sets of elevation-velocity data, determining at least one of a volatilization factor (VF) or a particulate emission factor (PEF) based on the determined diffusion prediction coefficient, and determining a risk from an inhalation exposure based on the at least one of the VF or the PEF.

The risk determining method may further include comparing the determined risk to a tolerable risk and providing information as to whether there is potential harm.

The determining of the diffusion prediction coefficient may include deriving an equation of a relationship between an elevation and a wind velocity based on the sets of elevation-velocity data, and determining the diffusion prediction coefficient based on the derived equation.

The determining of the diffusion prediction coefficient based on the equation may include determining a friction velocity and a friction height based on the equation, and determining the diffusion prediction coefficient based on the friction velocity and the friction height.

The obtaining of the sets of elevation-velocity data may include obtaining a plurality of sets of time-based elevation-velocity data according to a lapse of time. The determining of the diffusion prediction coefficient may include determining a time-based diffusion prediction coefficient according to a lapse of time, and determining a representative diffusion prediction coefficient based on the time-based diffusion prediction coefficient.

The risk determining method may further include determining a threshold friction velocity (TFV) based on a mode of a soil particle size distribution. The determining of the at least one of the VF or the PEF may include determining the PEF based on the TFV.

The risk determining method may further include determining a probability of occurrence of fugitive dust by comparing the TFV and the friction velocity.

The obtaining of the sets of elevation-velocity data may include simultaneously measuring the sets of elevation-velocity data.

According to another example embodiment, there is provided a risk determining apparatus including a processor configured to obtain a plurality of sets of elevation-velocity data, determine a diffusion prediction coefficient based on the obtained sets of elevation-velocity data, determine at least one of a VF or a PEF based on the determined diffusion prediction coefficient, and determine a risk from an inhalation exposure based on the at least one of the VF or the PEF.

The processor may compare the determined risk to a tolerable risk and provide information as to whether there is potential harm.

The processor may derive an equation of a relationship between an elevation and a wind velocity based on the sets of elevation-velocity data and determine the diffusion prediction coefficient based on the derived equation.

The processor may determine a friction velocity and a friction height based on the equation and determine the diffusion prediction coefficient based on the determined friction velocity and the determined friction height.

The processor may obtain a plurality of sets of time-based elevation-velocity data according to a lapse of time, determine a time-based diffusion prediction coefficient according to a lapse of time, and determine a representative diffusion prediction coefficient based on the time-based diffusion prediction coefficient.

The processor may determine a TFV based on a mode of a soil particle size distribution, and determine the PEF based on the determined TFV.

The processor may determine a probability of occurrence of fugitive dust by comparing the TFV and the friction velocity.

The processor may simultaneously measure the sets of elevation-velocity data.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout this disclosure, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

The following example embodiments may be embodied in various forms of products, for example, a personal computer (PC), a laptop computer, a tablet PC, a smartphone, a television (TV), a smart home appliance, an intelligent vehicle, a kiosk, and a wearable device. Hereinafter, examples will be described in detail with reference to the accompanying drawings, and like reference numerals in the drawings refer to like elements throughout.

Figure 1:
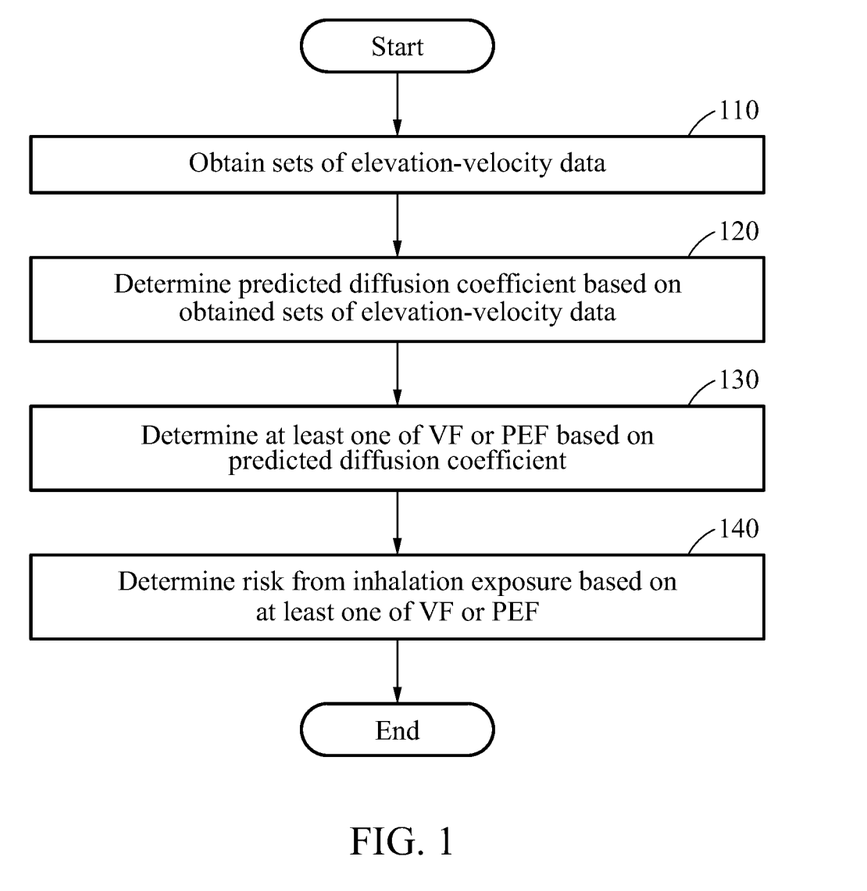
FIG. 1 is a flowchart illustrating an example of a risk determining method according to an example embodiment.

FIG. 1 is a flowchart illustrating an example of a risk determining method according to an example embodiment.

Operations 110 through 140 to be described hereinafter with reference to FIG. 1 may be performed by a risk determining apparatus. The risk determining apparatus may be an apparatus for determining a risk from soil contaminants in a certain area, and be embodied by one or more hardware modules, one or more software modules, or various combinations thereof.

A risk assessment is a series of processes including determining information of harmfulness of hazardous substances or materials, conducting a toxicity assessment and harmfulness determination, and conducting an exposure assessment and risk determination. For the risk assessment, various exposure paths through which a contaminant may be exposed to a receptor needs to be considered. The exposure paths include, for example, an inhalation exposure path along which a volatile contaminant in the air evaporates into the atmosphere and then is inhaled into a human body, and an inhalation exposure path along which scattered or diffused contaminated soil that is directly emitted into the atmosphere is inhaled.

The risk assessment may be performed based on a degree of risk (or simply referred to herein as a risk). The risk may refer to a probability or likelihood that a harmful result occurs in an individual or group exposed to a certain concentration or amount of a hazardous substance or material. A detailed method of determining such a risk will be described hereinafter.

Referring to FIG. 1, in operation 110, the risk determining apparatus obtains a plurality of sets of elevation-velocity data. The elevation-velocity data described herein refers to data of a wind velocity at each elevation. For example, the risk determining apparatus may measure the elevation-velocity data using a sensor included therein, or receive the elevation-velocity data measured by a separate sensor through communication with the sensor. The sensor may include a wind velocity measurer or an anemometer that measures a wind velocity at each elevation. For example, the wind velocity measurer may simultaneously measure corresponding wind velocities at various elevations, for example, 16, 39, 90, 120, 189, and 390 centimeters (cm).

In operation 120, the risk determining apparatus determines a diffusion prediction coefficient based on the obtained sets of elevation-velocity data. The diffusion prediction coefficient refers to a parameter for predicting the diffusion of a volatile contaminant or a scattered or diffused contaminant (hereinafter "fugitive dust") into the atmosphere. The diffusion prediction coefficient may be defined by an inverse number ((g/m2-s)/(kg/m3)) of a concentration of fugitive dust per unit flux, and be derived by applying a meteorological condition of a site. In the United States, all the states are classified into 29 regions according to a meteorological condition, and a diffusion prediction coefficient database to which respective meteorological conditions of all the regions is provided. However, in Korea, such research has not yet been conducted, and thus the risk assessment may not be readily applied in a site-specific manner.

A mass flux of a contaminant in the air may be represented by Equation 1 below.

$$J = -\frac{(C_{A1} - C_{A0}) \times Ku^*}{\ln\left(\frac{z}{z_0}\right)} \qquad \text{[Equation 5]}$$

In Equation 1, z denotes an elevation (cm). $C_{A1}$ denotes a concentration (g/m$^3$) of a contaminant at an elevation Z. $C_{A0}$ denotes a concentration (g/m$^3$) of a contaminant at a friction height $z_0$. K denotes a Kalman constant which is 0.41, and u* denotes a friction velocity (m/s).

By shifting a contaminant concentration term ($-(C_{A1}-C_{A0})$) to a left side, a left term may become a mass flux per contaminant concentration. Thus, the left term may indicate the same value as the diffusion prediction coefficient, which is represented by Equation 2 below.

$$\frac{Q}{C} = \frac{Ku^*}{\ln\left(\frac{z}{z_0}\right)} \times \frac{1{,}000 \text{ g}}{\text{kg}} \qquad \text{[Equation 2]}$$

An in-site friction velocity u* and an in-site friction height $z_0$ may be derived through Equation 3 which is an equation of a relationship between an elevation and a wind velocity. The equation of such a relationship may also be referred to herein as an elevation-velocity relationship equation.

$$u(z) = \frac{u^*}{K}\ln\frac{z}{z_0} \qquad \text{[Equation 3]}$$

In Equation 3, u(z) denotes a wind velocity (m/s) at an elevation z (cm).

Using the obtained sets of elevation-velocity data and Equation 3 above, it is possible to estimate an in-site friction velocity u* and an in-site friction height $z_0$. Hereinafter, a detailed method thereof will be described in detail with reference to FIG. 2.

FIG. 2 is a graph illustrating an example of extracting a parameter of an elevation-velocity relationship equation using obtained sets of elevation-velocity data according to an example embodiment.

Referring to Equation 3, a wind velocity at an elevation z is represented in a form of a linear function with respect to ln(z). A slope of the linear function is a u*/K, and a y-intercept of the linear function is u*/K*ln(z0).

In addition, referring to a graph 200 of FIG. 2, four sets of elevation-velocity data are obtained. Through modeling as represented by Equation 3 above using the obtained sets of elevation-velocity data, it is possible to obtain a value as represented by Equation 4 below.

$$u(z) = 0.90\ \ln(z) - 2.89 \qquad \text{[Equation 4]}$$

Based on Equations 3 and 4, a friction velocity u* and a friction height $z_0$ may be obtained as represented by Equation 5 below.

$$u^* = \frac{0.90}{K} = 2.20 \text{ m/s} \qquad \text{[Equation 5]}$$

$$z_0 = e^{\frac{2.89}{0.90}} = 24.81 \text{ cm}$$

By applying, to Equation 2, the friction velocity u* and the friction height $z_0$ that are obtained in Equation 5, it is possible to determine a site-specific diffusion prediction coefficient as represented by Equation 6 below.

$$\frac{Q}{C} = -\frac{Ku^*}{\ln\left(\frac{z}{z_0}\right)} \times \frac{1{,}000 \text{ g}}{\text{kg}} = 501.28(\text{g/m}^2 - \text{s})/(\text{kg/m}^3) \qquad \text{[Equation 6]}$$

Referring back to FIG. 1, in operation 130, the risk determining apparatus determines at least one of a volatilization factor (VF) or a particulate emission factor (PEF) based on the diffusion prediction coefficient. The VF and the PEF may indicate an inverse number (m$^3$/kg) of a concentration of a volatile substance per unit air volume and an inverse number (m$^3$/kg) of a concentration of fugitive dust, respectively. Based on the VF and the PEF, it is possible to determine a risk from a path along which a volatile contaminant in the air evaporates into the atmosphere and is inhaled into a human body, and a risk from a path along which a scattered contaminant or fugitive dust that is directly emitted into the atmosphere is inhaled, respectively.

A VF or PEF calculating formula may broadly include a term for predicting the volatilization of a contaminant or the emission of a contaminated soil particle, and a diffusion prediction coefficient for predicting the diffusion of volatile or fugitive dust in the atmosphere. The term for predicting the volatilization of a contaminant or the emission of a soil particle may be derived through a default value of a physical and chemical property of the contaminant and an investigated value of a physicochemical property of soil in a site. The diffusion prediction coefficient is determined in operation 120 as described above.

In operation 140, the risk determining apparatus determines a risk from an inhalation exposure based on the at least one of the VF or the PEF. The risk determining apparatus may determine a concentration $Coutd_{oor\ air}$ (mg/m$^3$) of an (outdoor) volatile substance in the outdoor air and a concentration $C_{fugitive\ dust}$ (mg/m$^3$) of fugitive dust based on the VF and the PEF, which are represented by Equation 7 below.

$$C_{outdoor\ air} = C_s \times \frac{1}{VF}$$
$$C_{fugitive\ dust} = C_s \times \frac{1}{PEF}$$
[Equation 7]

In Equation 7, $C_s$ denotes a soil exposure concentration (mg/kg).

The risk determining apparatus may determine the risk from the inhalation exposure based on the at least one of the concentration of the outdoor volatile substance or the concentration of the fugitive dust. In addition, the risk determining apparatus may compare the determined risk to a tolerable risk, and determine whether there is potential harm and/or provide information as to whether there is potential harm.

Figure 3:
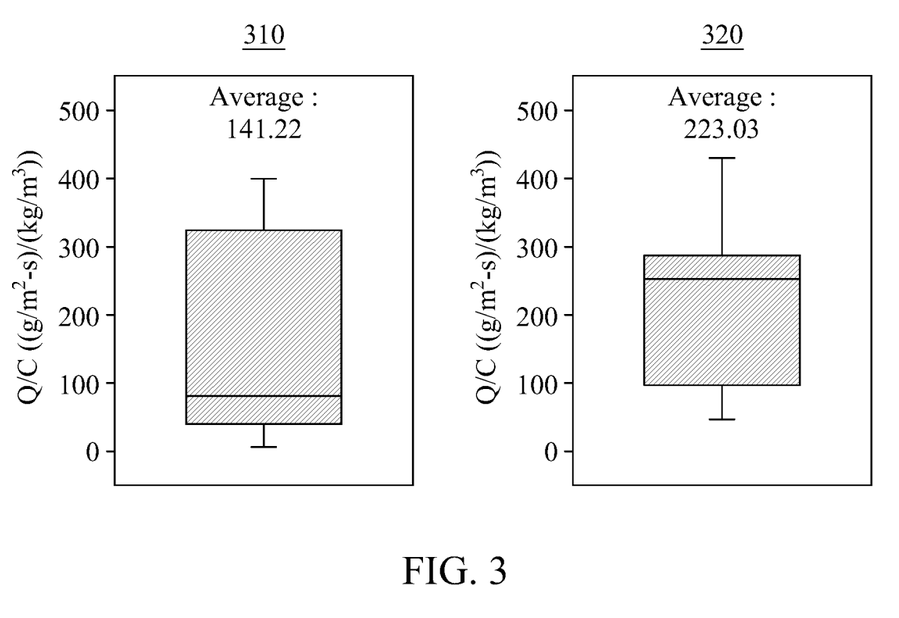
FIG. 3 is a graph illustrating examples of a diffusion prediction factor (Q/C) calculated by measuring a wind velocity in each time period according to an example embodiment.

FIG. 3 is a graph illustrating examples of a diffusion prediction coefficient (Q/C) calculated by measuring a wind velocity in each time period according to an example embodiment.

A wind velocity at each elevation may vary over time even in a same site. Thus, a series of operations including measuring a wind velocity in each time period, calculating diffusion prediction coefficient values, selecting a representative diffusion prediction coefficient value from among the calculated diffusion prediction coefficient values, and determining a risk using the representative diffusion prediction coefficient value may be performed.

Referring to FIG. 3, illustrated are a box plot graph 310 illustrating a diffusion prediction coefficient determined based on a wind velocity at each elevation that is measured at a first location, and a box plot graph 320 illustrating a diffusion prediction coefficient determined based on a wind velocity at each elevation that is measured at a second location.

In detail, lower ends of the graphs 310 and 320 may indicate 25th percentile of diffusion prediction coefficient values, and upper ends of the graphs 310 and 320 may indicate 75th percentile of the diffusion prediction coefficient values. In addition, horizontal lines of boxes of the graphs 310 and 320 may indicate median values, and outer horizontal lines above and below the boxes of the graphs 310 and 320 may indicate 5th percentile and 95th percentile of the diffusion prediction coefficient values, respectively.

As a representative value, an average value may be used, or a 25th percentile value and a 5th percentile value may be used for a conservative assessment. For example, as illustrated, a representative diffusion prediction coefficient corresponding to the first location may be 141.22 which is an average value, and a representative diffusion prediction coefficient corresponding to the second location may be 223.03 which is an average value.

Figure 4:
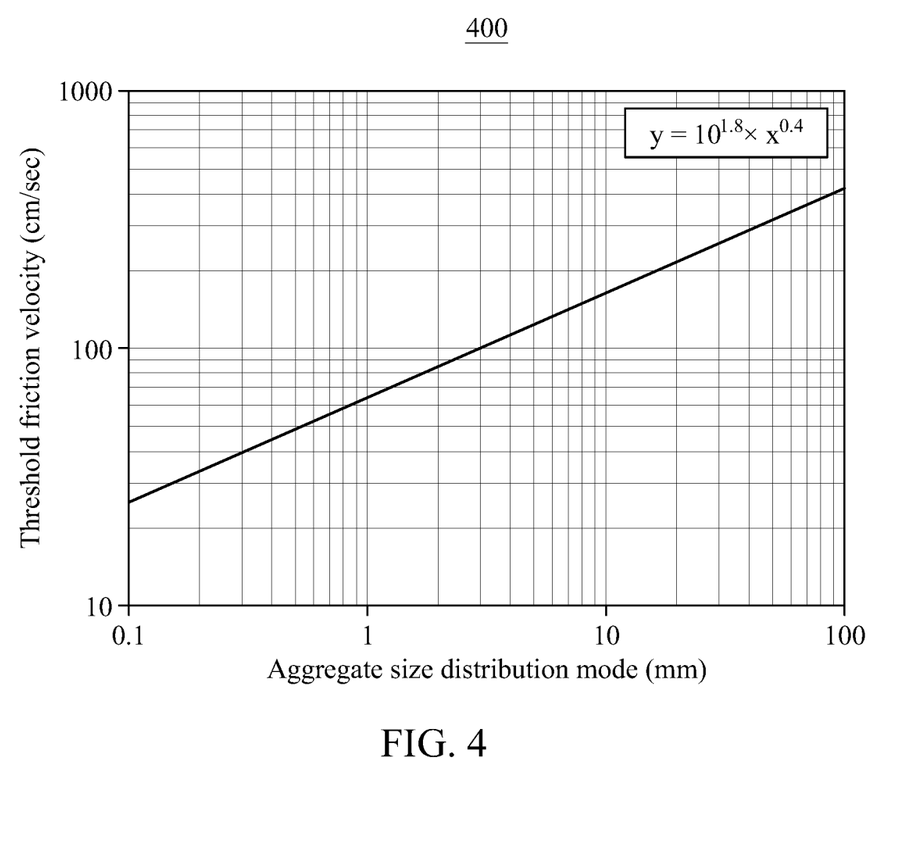
FIG. 4 is a graph illustrating an example of determining a threshold friction velocity (TFV) based on a diameter of a soil particle in a site according to an example embodiment.

FIG. 4 is a graph illustrating an example of determining a threshold friction velocity (TFV) based on a diameter of a soil particle in a site according to an example embodiment.

Referring to FIG. 4, a probability of occurrence of fugitive dust in a site may be determined by comparing, to a TFV, a friction velocity u* determined using a wind velocity measurer configured to measure a wind velocity at each elevation.

The TFV may refer to a wind velocity at which soil in a site starts to scatter or diffuse. For example, when a friction velocity of a site is greater than or equal to a TFV of the site, it is determined that the in-site soil is likely to scatter or diffuse. Conversely, when the friction velocity is less than the TFV, it is determined that the in-site soil is hardly likely to scatter or diffuse. The TFV may vary according to a mode of a particle size distribution of soil in a site. In addition, the TFV may also be used to determine a VF.

For example, the TFV may be determined by the following method. The method includes preparing sieves having opening sizes of 4 millimeters (mm), 2 mm, 1 mm, 0.5 mm, and 0.25 mm, and stacking the sieves in an order of the opening sizes starting with a sieve having the smallest opening size. The method then includes collecting approximately 1 cm of topsoil as a sample, and removing therefrom particles having a diameter of approximately 1 cm or greater. The sample soil may need to be smaller than 30 cm×30 cm. The method then includes pouring the soil through the 4 mm sieve and shaking it about 20 times, and then verifying an amount of the soil remaining on the sieve with the naked eye. Here, when there is a greatest amount of the soil left on the 2 mm sieve, a soil particle size distribution mode of a corresponding site may be 3 mm which is an average value between the 2 mm sieve and the 4 mm sieve. The TFV may be determined by applying such a mode of an in-site soil particle size distribution to a graph 400 illustrated in FIG. 4.

Figure 5:
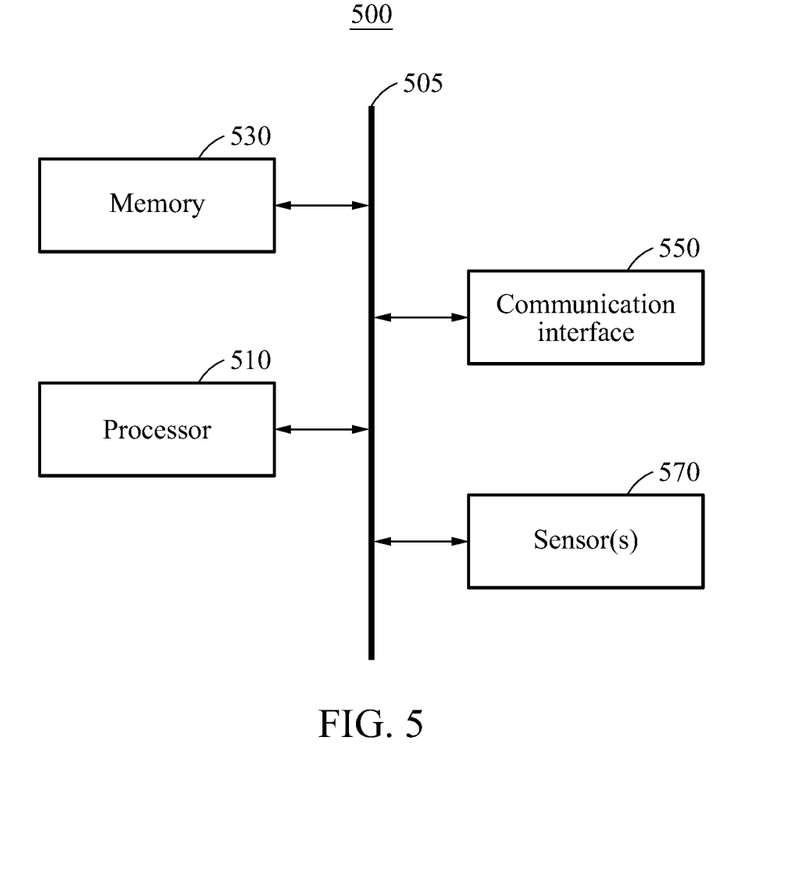
FIG. 5 is a diagram illustrating an example of a risk determining apparatus according to an example embodiment.

FIG. 5 is a diagram illustrating an example of a risk determining apparatus according to an example embodiment.

Referring to FIG. 5, a risk determining apparatus 500 includes a processor 510. The risk determining apparatus 500 further includes a memory 530, a communication interface 550, and a sensor(s) 570. The processor 510, the memory 530, the communication interface 550, and the sensor 570 may communicate with one another through a communication bus 505.

The processor 510 may obtain a plurality of sets of elevation-velocity data, determine a diffusion prediction coefficient based on the obtained sets of elevation-velocity data, determine at least one of a VF or a PEF based on the determined diffusion prediction coefficient, and determine a risk from an inhalation exposure based on the at least one of the VF or the PEF.

The memory 530 may include a registration database including the sets of elevation-velocity data, the diffusion prediction coefficient, the VF, and the PEF. The memory 530 may be a volatile or nonvolatile memory.

The sensor 570 may include, for example, a wind velocity measurer configured to measure a wind velocity at each elevation.

Depending on example, the processor 510 may compare the determined risk to a tolerable risk and provide information as to whether there is potential harm. The processor 510 may drive an elevation-velocity relationship equation based on the sets of elevation-velocity data and determine the diffusion prediction coefficient based on the relationship equation. The processor 510 may determine a friction velocity and a friction height based on the relationship equation, and determine the diffusion prediction coefficient based on the determined friction velocity and the determined friction height. In addition, the processor 510 may obtain a plurality of sets of time-based elevation-velocity data according to a lapse of time, determine a time-based diffusion prediction coefficient according to a lapse of time, and determine a representative diffusion prediction coefficient based on the determined time-based diffusion prediction coefficient. The processor 510 may determine a TFV based on a mode of a soil particle size distribution and determine the PEF based on the determined TFV. The processor 510 may compare the TFV and the friction velocity and determine a probability of occurrence of fugitive dust. The processor 510 may simultaneously measure the sets of elevation-velocity data.

Figure 2:
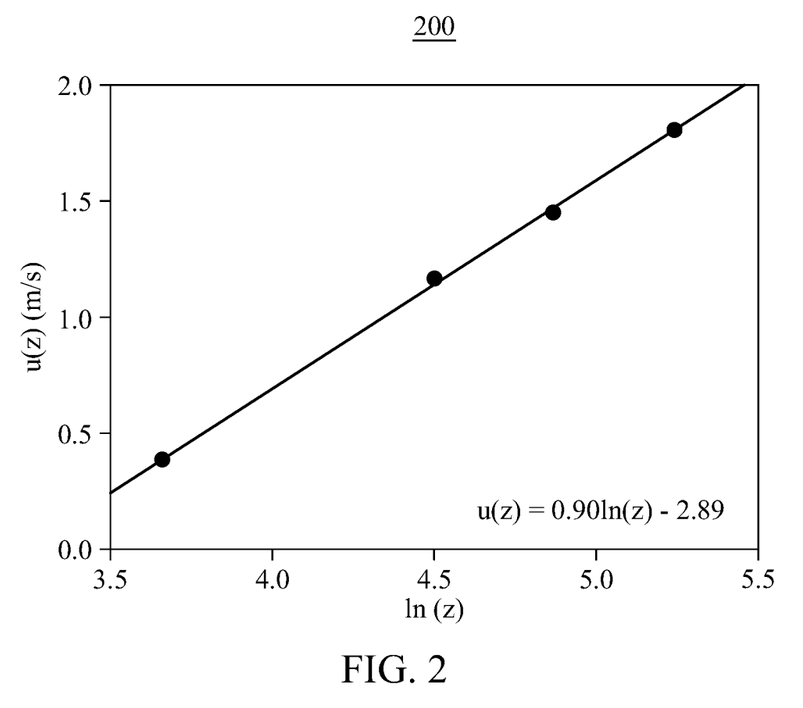
FIG. 2 is a graph illustrating an example of extracting a parameter of an equation representing a relationship between an elevation and a wind velocity using obtained sets of elevation-velocity data according to an example embodiment.

In addition, the processor 510 may perform one or more, or all, of the methods or operations described above with reference to FIGS. 2 through 4, or algorithms corresponding to the one or more methods or operations. The processor 510 may execute a program and control the risk determining apparatus 500. A code of the program executed by the processor 510 may be stored in the memory 530. The risk determining apparatus 500 may be connected to an external device (e.g., PC or network) through an input and output device (not shown) to exchange data with the external device. The risk determining apparatus 500 may be provided in various computing devices and/or systems, for example, a smartphone, a tablet PC, a laptop computer, a desktop computer, a TV, a wearable device, a security system, a smart home system, and the like.

According to an example embodiment, it is possible to use a VF and a PEF to predict whether a soil contaminant is volatilized or contaminated soil scatters or diffuses, and determine a diffusion prediction coefficient (Q/C) to conduct a site-specific inhalation exposure assessment using the VF and the PEF.

It is also possible to determine a risk from an inhalation exposure based on at least one of the VF or the PEF.

In addition, by predicting a probability that contaminated soil in a site scatters or diffuses using an in-site friction velocity derived in a process of calculating a site-specific diffusion prediction coefficient, it is possible to monitor and control a contaminated site.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A risk determining method, comprising:
   obtaining a plurality of sets of elevation-velocity data;
   determining a diffusion prediction coefficient based on the obtained sets of elevation-velocity data;
   determining at least one of a volatilization factor (VF) or a particulate emission factor (PEF) based on the determined diffusion prediction coefficient; and
   determining a risk from an inhalation exposure based on the at least one of the VF or the PEF.

2. The risk determining method of claim 1, further comprising:
   comparing the determined risk to a tolerable risk and providing information as to whether there is potential harm.

3. The risk determining method of claim 1, wherein the determining of the diffusion prediction coefficient comprises:
   deriving an equation of a relationship between an elevation and a wind velocity based on the sets of elevation-velocity data; and
   determining the diffusion prediction coefficient based on the derived equation.

4. The risk determining method of claim 3, wherein the determining of the diffusion prediction coefficient based on the equation comprises:
   determining a friction velocity and a friction height based on the equation; and
   determining the diffusion prediction coefficient based on the friction velocity and the friction height.

5. The risk determining method of claim 1, wherein the obtaining of the sets of elevation-velocity data comprises:
   obtaining a plurality of sets of time-based elevation-velocity data according to a lapse of time, and
   wherein the determining of the diffusion prediction coefficient comprises:
   determining a time-based diffusion prediction coefficient according to a lapse of time; and
   determining a representative diffusion prediction coefficient based on the time-based diffusion prediction coefficient.

6. The risk determining method of claim 1, further comprising:
   determining a threshold friction velocity (TFV) based on a mode of a soil particle size distribution,
   wherein the determining of the at least one of the VF or the PEF comprises:
   determining the PEF based on the TFV.

7. The risk determining method of claim 6, further comprising:
   determining a probability of occurrence of fugitive dust by comparing the TFV and a friction velocity.

8. The risk determining method of claim 1, wherein the obtaining of the sets of elevation-velocity data comprises:
   simultaneously measuring the sets of elevation-velocity data.

9. A computer program embodied on a non-transitory computer-readable storage medium, the computer program being configured to control a processor to perform the risk determining method of claim 1.

10. A risk determining apparatus, comprising:
    a processor configured to obtain a plurality of sets of elevation-velocity data, determine a diffusion prediction coefficient based on the obtained sets of elevation-velocity data, determine at least one of a volatilization factor (VF) or a particulate emission factor (PEF) based on the determined diffusion prediction coefficient, and determine a risk from an inhalation exposure based on the at least one of the VF or the PEF.

11. The risk determining apparatus of claim 10, wherein the processor is configured to:
    compare the determined risk to a tolerable risk and provide information as to whether there is potential harm.

12. The risk determining apparatus of claim 10, wherein the processor is configured to:
    derive an equation of a relationship between an elevation and a wind velocity based on the sets of elevation-velocity data; and
    determine the diffusion prediction coefficient based on the derived equation.

13. The risk determining apparatus of claim 12, wherein the processor is configured to:
    determine a friction velocity and a friction height based on the equation; and
    determine the diffusion prediction coefficient based on the determined friction velocity and the determined friction height.

14. The risk determining apparatus of claim 10, wherein the processor is configured to:
    obtain a plurality of sets of time-based elevation-velocity data according to a lapse of time;
    determine a time-based diffusion prediction coefficient according to a lapse of time; and
    determine a representative diffusion prediction coefficient based on the time-based diffusion prediction coefficient.

15. The risk determining apparatus of claim 10, wherein the processor is configured to:
    determine a threshold friction velocity (TFV) based on a mode of a soil particle size distribution; and
    determine the PEF based on the determined TFV.

16. The risk determining apparatus of claim 15, wherein the processor is configured to:
    determine a probability of occurrence of fugitive dust by comparing the TFV and a friction velocity.

17. The risk determining apparatus of claim 15, wherein the processor is configured to:
    simultaneously measure the sets of elevation-velocity data.

* * * * *